Figure 1:
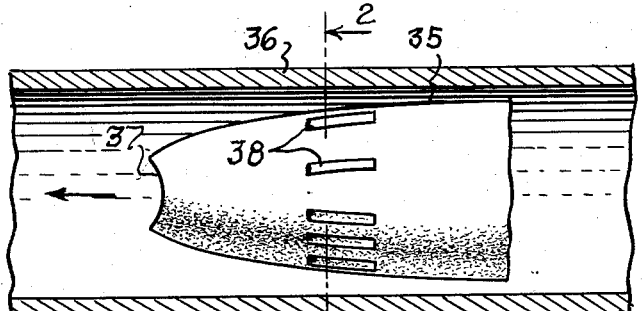

INVENTOR.
Theodore Hafner

United States Patent Office 3,108,546
Patented Oct. 29, 1963

1

3,108,546
AIR CUSHION SUPPORTED VEHICLES
Theodore Hafner, 521 5th Ave., New York, N.Y.
Filed Mar. 7, 1960, Ser. No. 13,337
2 Claims. (Cl. 104—138)

This invention relates to vehicles traveling on an air cushion.

One of the objects of this invention is to provide a tubular passage for the vehicle so as to produce predetermined air current and pressure conditions, not only below but also all around the vehicle to obtain propulsion at maximum efficiency.

Another object of the invention is to produce predetermined pressure conditions on at least two diametrical points of the vehicle.

Still another object of the invention is to provide around the vehicle a predetermined peripheral air gap of predetermined and preferably substantially continuous pressure distribution so as to cause centering of the vehicle in a predetermined position within a minimum tubular space.

Still another object of the invention is to provide a vehicle of a shape substantially adapted to the air current and pressure conditions existing in a tubular passage of predetermined cross section surrounding the vehicle.

A further object of the invention is to provide on the vehicle, guiding flaps for horizontal and vertical control with respect to the tubular space as well as for horizontal and vertical control of one part of the craft with respect to the other.

Still a further object of the invention is to cause air movement by means such as a reaction motor within the body of the vehicle and additional means being provided to guide and control the air or gas flow towards the peripheral air gap.

It has been known to transport vehicles over an air cushion formed between the bottom of the vehicle and ground surface. One of the disadvantages of this type of transportation is, while it permits the achievement of rather high speeds, it requires a great deal of power for rather limited pay loads.

This inefficiency in operation has been found to be based to a large extent on the losses incurred in providing the air cushion and caused by lateral escape of air from the air cushion, which tends to reduce the air cushion pressure.

Another disadvantage has been found in the relatively uncontrolled air flow occurring not only on the sides but also on the top as well as at the front and rear ends of the vehicle, all contributing to losses reducing efficiency of transportation.

These disadvantages are reduced if not avoided, in accordance with the invention, by enclosing the vehicle in a predetermined space and forming a peripheral air gap around it which permits a predetermined and relatively accurate control of the air flow and pressure, thereby reducing losses to a minimum and exploiting to its maximum the air cushion for carrying the vehicle.

Another advantage of the invention is that it permits shaping of the air vehicle to its best form cooperating with the shape of the surrounding enclosure and, at the same time, it provides propulsion and guiding means adapted to this combined structure and capable of exact design and operation, thereby assuring the movement of the vehicle in predetermined relative positions with respect to the enclosure.

A further advantage of this combination is the possibility of using existing experiences and structures derived from the construction and guidance of other vehicles, such as the airplane or guided missile.

2

More specifically, in accordance with the invention, in some cases, it becomes possible to use existing structures for propelling, guiding and embodying the vehicle.

Figure 2:
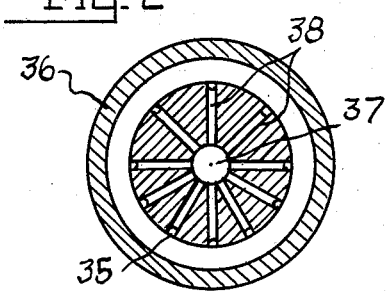
Figure 3:
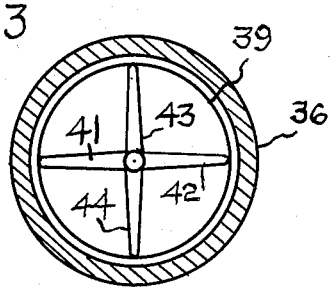
Figure 4:
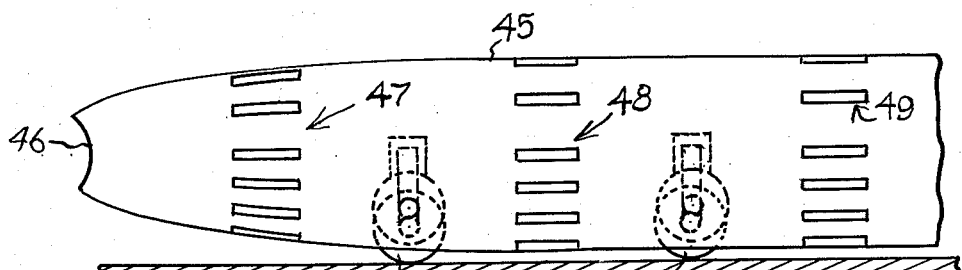
Figure 5:
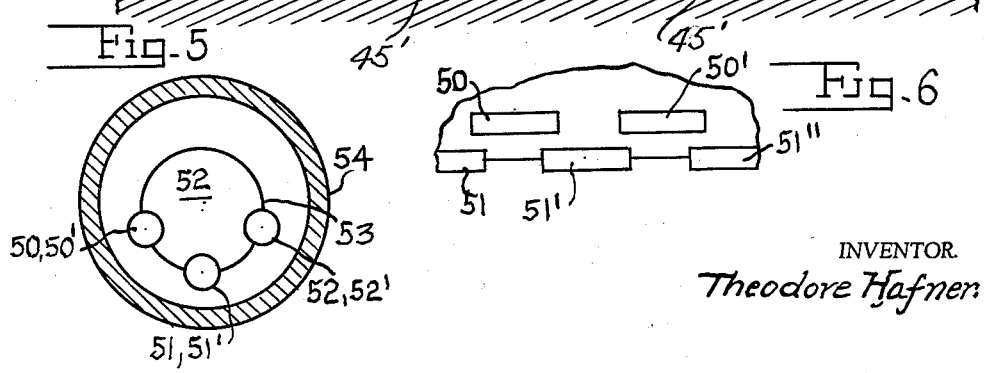
Figure 6:
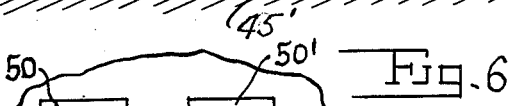

For other objects and a better understanding of the invention, reference may be had to the following detailed description taken in connection with the accompanying drawing, in which FIGURE 1 is a fragmentary longitudinal elevational view of the air borne type of tubular vehicle in flight through a tubular passage, FIG. 2 is a cross-sectional view of the vehicle and the tubular passage as viewed on line 2—2 of FIGURE 1, FIG. 3 is a rear and elevational view of the vehicle looking upon the vertical and horizontal flaps, with the tubular passage being in section, FIG. 4 is a side elevational view of the modified air borne vehicle having multiple arrays of outlets resting upon the extended landing wheel, FIG. 5 is a cross-sectional view of a tubular passage and looking in elevation upon a vehicle utilizing several reaction motors for propulsion, and FIG. 6 is a fragmentary side elevational view of the vehicle shown in FIG. 5, showing the cascade arrangement of the reaction motors along the outer surface of the vehicle.

In FIG. 1 a transportation system according to the invention is shown to include an inner tube vehicle 35 consisting preferably of lightweight material such as aluminum and an outer tube 36 consisting of concrete or of steel imbedded in concrete or wholly or partially concrete. Tube vehicle 35 may be streamlined in a manner similar to that of an airplane body and provided at its front end with a propelling reaction motor 37.

In FIGURE 1, a vehicle 35, arranged to move in cylindrical tube or tubular passage 36, is provided with a reaction motor schematically indicated at 37. Air as well as reaction gases may be guided through tubes or passages schematically indicated at 38 to desired points on the outer surface of vehicle 35 to feed in a controlled manner the corresponding portions of the peripheral air space or gap between vehicle 35 and tube 36.

The rear view of FIG. 3 shows steering mechanisms at the back of a vehicle in accordance with the invention. A protective cylindrical cover sheet is schematically indicated at 39 surrounding horizontal and vertical flaps 41, 42, 43, 44, all preferably movable substantially independently from each other to assure accurate positioning of vehicle within outer cylinder or tube passage 36.

FIG. 4 shows a vehicle 45 of elongated or cigar-shaped structure in which the exhaust gases and the air derived respectively from a reaction motor 46 at the front end of vehicle 45 and which are distributed over the peripheral air gap by means of tubes to a number of outlets or arrays of outlets shown at 47, 48, 49, respectively, and arranged along the elongated portion of vehicle 45. The vehicle 45 has retractable landing gear 45'.

As apparent further from FIG. 4, the openings of each array, 47, 48, 49, are not distributed equally over the periphery of vehicle 45 but in such a way as to provide more air and to produce a higher air pressure in the air cushion on the bottom portion of the peripheral air gap than on its top portion, all of course depending on the shape of this air gap.

As apparent from FIGS. 5 and 6, three reaction motors schematically indicated at 50, 51, 52 are arranged at the bottom of a vehicle 53 arranged to move within an outer tube 54. Motors 50, 51, 22 are not only peripherally spaced in a cross section of vehicle 53 but are also arranged staggered along its longitudinal extension with a number of reaction motors 50, 50', 51, 51', 51'', and 52, 52′ being arranged in cascade along the outer surface of vehicle 53.

While the invention has been illustrated with certain propulsion means, certain vehicular means and certain tubular means as well as certain stabilizing means and also with certain means for controlling these stabilizing means, the invention is in no way limited to the particular shapes and structures shown but may be applied in any form or manner whatsoever without departing from the scope of this disclosure.

I claim:

1. In a vehicular transportation system, tubular passage means, a self-propelled air borne type inner tubular shaped vehicle means arranged within said tubular passage means and adapted to be spaced therefrom by a continuous uninterrupted peripheral air gap separating said tubular vehicle over its entire circumference from the wall of tubular passage means, and reaction motor propelling means on said tubular-shaped vehicle for discharging gases and air rearwardly so as to establish propulsion of the vehicle within the passage means and discharging gases and air radially over the bottom and top of the tubular vehicle throughout the entire extent of said peripheral gap to provide a riding cushion beneath said tubular vehicle and over the top thereof to form a physically defined uninterrupted ring of discharging gas and air about the tubular vehicle with respect to said tubular passage means whereby to maintain the tubular vehicle suspended within the tubular passage means while being propelled therethrough.

2. In a vehicle transportation system as defined in claim 1, said tubular vehicle having openings extending about the entire periphery of its surface for the discharging of the exhaust gases of the reaction motor and the propelling air thereover, said openings being distributed closer together over the bottom surface of the vehicle than over the top thereof so as to provide a higher air pressure in the air cushion in the bottom portion of the peripheral air gap than in the top portion thereof.

References Cited in the file of this patent
UNITED STATES PATENTS

| | | |
|---|---|---|
| 936,395 | Worthington | Oct. 12, 1909 |
| 1,000,009 | Jenison | Aug. 8, 1911 |
| 1,411,597 | Trask | Apr. 4, 1922 |
| 1,685,035 | Robertson | Sept. 18, 1928 |
| 2,118,127 | Wulle | May 24, 1938 |
| 2,511,979 | Goddard | June 20, 1950 |
| 2,717,744 | Birnbaum | Sept. 13, 1955 |
| 2,864,318 | Toulmin | Dec. 16, 1958 |

OTHER REFERENCES

"A Text Book of Physics," by L. B. Spinney, published by the Macmillan Co., New York, 1920, pages 152 to 156.